United States Patent
Jayaraman et al.

(10) Patent No.: US 11,079,068 B2
(45) Date of Patent: Aug. 3, 2021

(54) RAPID FILL COMPRESSED GAS STORAGE TANK

(71) Applicant: TDA Research, Inc, Wheat Ridge, CO (US)

(72) Inventors: Ambalavanan Jayaraman, Highlands Ranch, CO (US); Michael Travis Bonnema, Arvada, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 16/989,815

(22) Filed: Aug. 10, 2020

(65) Prior Publication Data

US 2021/0041065 A1    Feb. 11, 2021

Related U.S. Application Data

(60) Provisional application No. 62/884,646, filed on Aug. 8, 2019.

(51) Int. Cl.
*F17C 5/06* (2006.01)
*F17C 13/02* (2006.01)

(52) U.S. Cl.
CPC .............. *F17C 5/06* (2013.01); *F17C 13/026* (2013.01); *F17C 2201/0109* (2013.01);
(Continued)

(58) Field of Classification Search
CPC .... F17C 5/06; F17C 13/026; F17C 2221/012; F17C 2201/0109; F17C 2250/043;
(Continued)

(56) References Cited

U.S. PATENT DOCUMENTS 2,023,696 A * 12/1935 Porteous ................. F23C 99/00
                                                    431/173
3,826,474 A *  7/1974 Pareja ................... B01F 5/0413
                                                    137/888
(Continued)

FOREIGN PATENT DOCUMENTS

DE              950026 C  * 10/1956   .......... B01F 3/04078
DE     102014209921 A1 * 11/2015   ................ F17C 3/08
(Continued)

OTHER PUBLICATIONS

JP-2007298051-A_English_Translation_of_Specification (Year: 2020).*
(Continued)

*Primary Examiner* — Timothy P. Kelly
*Assistant Examiner* — Stephanie A Shrieves
(74) *Attorney, Agent, or Firm* — Brian J Elliott

(57) ABSTRACT

A method for rapidly filling a compressed gas storage tank with a moderated temperature rise using a Coanda nozzle to inject the feed gas into the tank and using the Coanda nozzle to direct the feed gas along the inner surface of the storage tank; entraining the stored gas with the feed gas that is flowing under the influence of the Coanda effect to flow along the inner surface of the gas storage tank; and transferring heat from the flowing gas to the external walls of the tank. Also, a compressed gas storage tank for rapid filling with a moderated temperature rise comprising: a gas storage tank and a Coanda nozzle capable of directing feed gas that is injected into the gas storage tank along the inner surface of the gas storage tank.

8 Claims, 16 Drawing Sheets

(52) U.S. Cl.
  CPC .. *F17C 2221/012* (2013.01); *F17C 2250/043* (2013.01); *F17C 2250/0439* (2013.01); *F17C 2265/065* (2013.01)

(58) Field of Classification Search
  CPC ........ F17C 2265/065; F17C 2250/0439; F17C 2227/0114; F17C 2205/0391; Y02E 60/32
  USPC ............................................................ 141/4
  See application file for complete search history.

(56) References Cited

U.S. PATENT DOCUMENTS

| | | | | |
|---|---|---|---|---|
| 4,557,637 | A * | 12/1985 | Barclay | B01J 8/003 239/405 |
| 4,581,285 | A * | 4/1986 | Mahefkey, Jr. | F16L 59/029 442/378 |
| 8,662,343 | B1 * | 3/2014 | Coors | F17C 1/005 220/586 |
| 9,897,255 | B2 * | 2/2018 | Coors | F17C 1/00 |
| 9,903,355 | B2 * | 2/2018 | Chiara | C10L 3/10 |
| 2007/0261756 | A1 | 11/2007 | Handa | |
| 2010/0155404 | A1 * | 6/2010 | Friedlmeier | F17C 5/06 220/581 |

FOREIGN PATENT DOCUMENTS

| | | | | |
|---|---|---|---|---|
| JP | 2007298051 | A * | 11/2007 | |
| WO | WO-2014057390 | A1 * | 4/2014 | ............ B01J 20/226 |
| WO | WO-2019096582 | A1 * | 5/2019 | ................ F17C 5/06 |

OTHER PUBLICATIONS

WO-2019096582-A1_English_Translation_of_Specification (Year: 2020).*
Simonovski, Igor, Thermal Simulations of a Hydrogen Storage Tank During Fast Filling, Aug. 1, 2015, SienceDirect [retrieved on Dec. 3, 2020. Retrieved from the Internet URL: https://www.sciencedirect.com/science/article/pii/S0360319915015992] (Year: 2015).*
DE-950026-C English Translation of Specification (Year: 2021).*
DE-102014209921-A1 English Translation of Specification (Year: 2021).*

* cited by examiner

| Dimension (mm) | | | | | |
|---|---|---|---|---|---|
| A | 3.973 | 3.973 | 3.973 | 3.973 | 3.973 |
| B | 0.020 | 0.020 | 0.015 | 0.019 | 0.019 |
| C | -0.630 | -0.377 | 0.131 | 0.080 | 0.029 |
| Resulting Coanda Ratio | 12.0 | 13.0 | 13.6 | 13.9 | 14.6 |

RAPID FILL COMPRESSED GAS STORAGE TANK

CROSS-REFERENCE TO RELATED APPLICATIONS

This application claims the benefit of U.S. Provisional Application No. 62/884,646, filed Aug. 8, 2019.

STATEMENT REGARDING FEDERALLY SPONSORED RESEARCH OR DEVELOPMENT

This invention was made using U.S. government funding through the U.S. Department of Energy contract No. DE-SC0018757. The government has certain rights in this invention.

FIELD OF THE INVENTION

The present invention generally relates to compressed gas tanks used in applications where rapid filling is needed and where reducing the temperature rise associated with the heat of compressing the gas is desired. The present invention also relates to hydrogen storage tanks, and other gas storage tanks. The present invention also relates to hydrogen storage tanks used in fuel cell electric vehicles.

BACKGROUND

Fuel Cell Electric Vehicles (FCEVs) that are typically designed for a 300 mile driving range use compressed hydrogen gas storage tanks, for example Type IV polymer lined 700 bar compressed gas tanks. Retail hydrogen refueling stations are opening to the public in California with more expected. However, the rapid filling of FCEVs requires cooling to avoid dangerous heat build-up in the tank due to the heat of compression. About 15% of the cost of fueling stations is due to pre-cooling equipment that chills the hydrogen to −40° C. so that fills can be completed in three minutes, in compliance with the SAE J2601 Fueling Protocol for Light-Duty Gaseous Hydrogen Surface Vehicles (SAE 2016). The requirement to pre-cool hydrogen gas to −40° C. is driven by the need to offset the temperature rise caused by the heat of compression during fueling. This requirement is driven by the upper temperature limits (−85° C.) of the polymer liner of the 700 bar compressed tanks and by the need to maximize the amount of hydrogen that can be stored in the tank (referred to as state of charge—SOC) after refueling.

Compressed gaseous on-board storage is used on FCEVs to guarantee a range similar to regular cars and provide a fill time of approximately 3 min. Tanks consist of an internal liner and an external carbon fiber reinforced composite. To be able to reach the required hydrogen storage densities, these tanks are designed to work at or below a nominal working pressure (NWP) of 70 MPa. Two types of liners, a metal liner and a high molecular weight polymer liner are used.

During the fast filling process, the work delivered by the compressor on the gas to increase its pressure also increases the temperature of the gas inside the tank. When the warm gas of the filled tank cools down, exchanging heat to the colder environment through the walls, the pressure also decreases and the finally "settled" pressure is less than the pressure immediately after refueling, resulting in under-filling and reducing the range of the vehicle.

The temperature rise is the major issue in the refilling process, and there are three main constraints: the safe temperature limit, the maximum filling pressure and the state of charge of the tank. The safe temperature limit of the hydrogen inside the tank is 85° C. for a polymer lined tank while the maximum filling pressure has been established as 125% of the NWP (87.5 MPa for a 70 MPa NWP tank. In order to reach the full SOC, the hydrogen gas must be pre-cooled before filling.

There are several parameters that influence the gas temperature within the tank at the end of the filling, for example; ambient temperature, starting pressure (initial state of charge), initial gas temperature and the properties of the tank. Also, the lower the length to diameter ratio of a tank, the lower the final gas temperatures inside the tank is, and the later it occurs.

Other methods of controlling the temperature rise include the use of phase change materials (PCMs). These PCMs act as a thermal buffer during refueling and to slowly dissipate the heat of refueling over time. Unfortunately, the phase change media used in storage tanks has shown very little difference in the gas temperature inside the tank (reducing the max temperature rise during rapid filling by only 2° C.) at the end of refueling and a 20° C. lower gas temperature at 1 hour after refueling compared to plain Type IV tank (polymer lined). Worse, a Type IV tank with PCM is known to take on ~12% less hydrogen during refueling than a system that uses gas pre-cooling.

Alternatively, employing a gas circulation using an ejector pump that uses the mechanical energy of the high pressure refueling gas to carry the heat of compression to a cooling system (a gas or -liquid cooled radiator) is shown in U.S. Patent Application (U.S. 2007/0261756 A1). Unfortunately, having an external radiator actually adds more complexity, weight and volume than a PCM.

Hence, there is a need for an improved hydrogen storage tank that can reduce or even eliminate the burden of pre-cooling at the hydrogen refueling station, and does so without significantly impacting the performance of the hydrogen storage system (including the final SOC). Such a gas storage tank is also needed to compressed other gasses including natural gas tanks and other pressurized gas systems as well.

SUMMARY OF THE INVENTION

The present invention solves the limitations of the prior art by providing a gas storage tank that can be rapidly filled with a significantly reduced temperature rise compared to the prior art and reduces or even eliminate the pre-cooling needs for the gas. The present invention provides a compressed gas storage tank with a Coanda nozzle to inject feed gas into the gas storage tanks. An embodiment of the invention is a Coanda nozzle with a flow restriction and a curved surface that cause the injected feed gas to follow the curved surface of the Coanda nozzle and be directed in a direction along (parallel to) the internal surfaces of the gas storage tank. The Coanda Effect is used to direct the feed gas along the internal surfaces of the tank. Directing the feed gas along the walls increases the heat transfer to the external surfaces of the tank (and then on to the surrounding environment). Another embodiment of the present invention is a mixing zone near the Coanda nozzle, where the gas inside the tank is mixed with the feed gas and the two are entrained and forced to pass along the tank walls for improved heat transfer. The present invention provides a mechanically simple, and highly effective solution to the problem of the heat that builds up inside the gas tank while rapidly filling.

An embodiment of the invention is a method for rapidly filling a compressed gas storage tank with a moderated temperature rise, comprising: providing a gas storage tank, wherein the storage tank has an inner surface, an outer surface, a proximal end, a distal end, and a midpoint between the proximal end and the distal end; providing a stored gas, wherein the stored gas is contained inside the gas storage tank; providing a feed gas; providing a Coanda nozzle to inject the feed gas into the gas storage tank, wherein the Coanda nozzle if effectively connected to the proximal end of the gas storage tank; injecting the feed gas into the gas storage tank through the Coanda nozzle; using the Coanda nozzle to direct the feed gas along a curved surface of the Coanda nozzle, wherein a Coanda effect causes the feed gas to flow along the inner surface of the storage tank; providing a gas mixing zone at the proximal end of the gas storage tank that is in fluid communication with the feed gas; entraining the stored gas with the feed gas in the gas mixing zone to form a mixed gas using inertia of the feed gas that is flowing under the influence of the Coanda effect to direct the mixed gas to flow along the inner surface of the gas storage tank; and transferring heat from the flowing gas to the external walls of the tank. Optionally the method further comprises: providing a phase change material along the inner surface of the gas storage tank; and transferring heat from the flowing gas to the phase change material. In further optional embodiments, the method further comprises: providing an inner liner and providing a gap, wherein the inner liner is positioned inside the gas storage tank such that it forms the gap between the inner surface of the gas storage tank and the inner liner, wherein the mixed gas flows through the gap. In further optional embodiments yet, the method provides that the inner liner provides a gap for the mixed gas to flow through that is continuous from the proximal end to at least 15% of the length from the proximal end to the distal end of the gas storage tank, preferably at least to the midpoint of the gas storage tank, more preferably at least 90% of the way to the distal end of the gas storage tank.

In an optional embodiment the method provides that the inner liner comprises a phase change material; and transferring heat from the mixed gas to the inner liner. Or, the method provides that the inner liner comprises a phase change material; and, transferring heat from the flowing gas to the inner liner.

In an optional embodiment the method further comprises: providing a phase change material along the outer surface of the gas storage tank; and, transferring heat from the mixed gas to the inner surface of the storage tank and from the storage tank to the phase change material on the outer surface.

In yet another optional embodiment, the method further comprises: providing a phase change material insert inside the gas storage tank; and, transferring heat from the mixed gas to the phase change material insert.

In a separate embodiment the invention provides a compressed gas storage tank for rapid filling with a moderated temperature rise, the gas storage tank comprising: a gas storage tank comprising a pressure vessel, an inner surface, an outer surface, a proximal end, a distal end and a midpoint between the proximal end and the distal end; and, a Coanda nozzle, wherein the Coanda nozzle is operably connected to the gas storage tank at the proximal end, and wherein the Coanda nozzle comprises a curved surface capable of directing feed gas that is injected into the gas storage tank along the inner surface of the gas storage tank. Optionally, the gas storage tank further comprises a phase change material on the inner surface of the gas storage tank. In another optional embodiment, the gas storage tank comprises an inner liner, wherein the inner liner is positioned inside the gas storage tank such that it forms a gap that injected gas can flow through, the gap being located between the inner surface of the tank and the inner liner. In another optional embodiment, the inner liner comprises an orifice that defines a mixing zone adjacent to the Coanda nozzle, wherein the mixing zone can operably mix feed gas with gas inside the gas storage tank. Optionally, the inner liner extends from the proximal end of the gas storage tank to at least 15% of the distance from the proximal end to the distal end, preferably to at least the midpoint of the gas storage tank, and more preferably at least 90% of the distance from the proximal end the distal.

In an optional embodiment the inner liner comprises a phase change material. In yet another optional embodiment the gas storage tank further comprises: a phase change material insert inside the gas storage tank. Lastly, in an optional embodiment the gas storage tank further comprises: a phase change material on the outer surface of the pressure vessel.

DETAILED DESCRIPTION OF THE INVENTION

Figure 1:
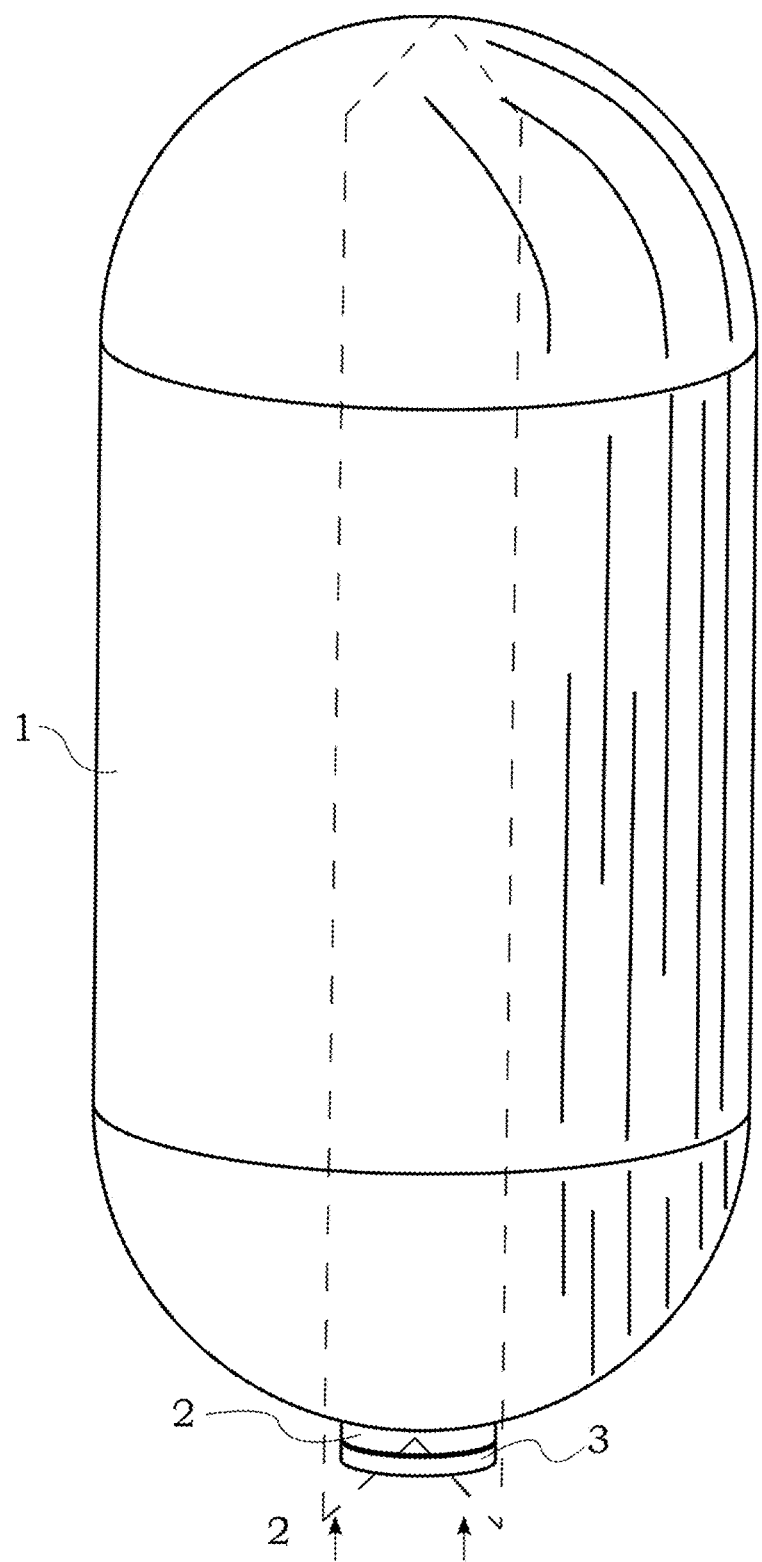
FIG. 1: solid outer tank drawing showing the sliced viewpoint of FIGS. 2A, 2B and 2C.

Fuel Cell Electric Vehicles (FCEVs) are now commercially available, but their commercial success will require significant reductions in the cost of hydrogen fueling. Capital and maintenance costs of the hydrogen refueling stations are major contributors to the higher costs of hydrogen for the FCEVs. About 15% of the cost of fueling stations is due to the pre-cooling equipment that chills the hydrogen to −40° C. so that fills can be completed in three minutes, in compliance with the SAE J2601 Fueling Protocol for Light-Duty Gaseous Hydrogen Surface Vehicles. Pre-cooling to these temperatures increases the complexity and cost of the hydrogen dispensers, which account for 14% of station's cost (and constitute the second largest cause of station maintenance issues). The requirement to pre-cool hydrogen gas to −40° C. is driven by the need to offset the temperature rise caused by the heat of compression during fueling, since the polymer liner of conventional 700 bar compressed tanks is limited to a maximum temperature of 85° C. If the −40° C. precooling requirement could be reduced or even eliminated without significantly impacting the performance of the hydrogen storage system the cost of delivered hydrogen could be significantly reduced.

Hence, there is a need for a gas (hydrogen) storage tank that incorporates novel cooling schemes to quickly dissipate/absorb the heat of compression and keep the hydrogen gas temperature well below the hydrogen tank design temperature of 85° C. with minimal impact on the cost, weight, volume, fill time, and well-to-power plant efficiency.

The present invention: 1) incorporates novel cooling schemes with the use of phase change media (PCM) to quickly absorb the heat of compression, and 2) microstructures in the tank inlet and wall to provide active gas circulation (2-20× the refueling rate) inside the tank during refueling to keep the hydrogen gas temperature at or under temperatures well below the hydrogen tank's design temperature of 85° C. The invention eliminates the need to precool the gas and can use gas at temperatures up to ambient (25° C.), while keeping the refueling times to 3 minutes or less and providing a higher ending state of charge (SOC) or with same SOC a lower end of refueling pressure when using ambient temperature gas during refueling.

The new design for the gas storage tank maximizes the heat transfer area and the heat transfer coefficients to quickly dissipate the heat throughout the refueling process. While there are passive tank designs that use phase change media to absorb the heat of compression in prior art, in these designs the gas temperature still exceeds the 85° C. limit during re-fueling, which both exceeds the maximum use temperature and reduces the capacity of the tank by 12% or more. The main drawback of these designs is not that they lack the ability to store the heat of compression, but that the heat transfer area and the heat transfer coefficients are not large enough to pull the heat out of the gas and into the phase change media during the three minute charge (refueling) time. The present invention not only maximizes the heat transfer area and the heat transfer coefficients to transfer the heat to the PCM, it also employs active cooling of the hot gas through the use of a Coanda nozzle at the inlet end of the gas storage tank as shown in 2A and FIG. 2B. The Coanda effect is the tendency of a fluid jet to stay attached to a convex surface (this is the mechanism behind how air multipliers and amplifiers operate) and in the gas storage tank is generated along the walls of the tank by the inlet high pressure gas (motive gas) and it draws the higher temperature gas (already present in the tank—bulk gas) from the other end of the tank with it along through a microchannel (with increased heat transfer) along the walls of the tank, which are lined by a thin layer of PCM (on such embodiment is presented in FIG. 2A, FIG. 2B and FIG. 2C). This flow pattern develops during refueling to dissipate the heat throughout the refueling process into the PCM (or the passive walls of the tank). The present invention will have minimal impact on the cost, weight, and volume of the gas storage tank and the fill time, and well-to-power plant efficiency of the gas being refilled.

The present invention allows the inlet hydrogen temperature to be increased to 0° C. from the −40° C. currently used with a 0.25" increase in tank diameter (from the current 10.57") and 5% increase in tank volume. The inlet hydrogen temperature can be further increased to 25° C. with 0.5" increase in tank diameter and 9% increase tank in volume. The present invention has minimal impact on the weight, and volume of the gas storage tank while keeping the same fill time. Most importantly, we can provide a much higher (>15%) well-to-power plant efficiency for the hydrogen refilled due to elimination of the pre-cooling need.

The present invention teaches the use of Coanda effect to provide active gas recirculation in a gas storage tank during refilling from another gas storage tank to increase the heat transfer from the bulk gas to the tank wall and/or a phase change media, which can be housed anywhere in the tank including on the outside of the exterior wall. The present invention is a compressed gas storage tank for rapid filling with a modulated temperature rise, the gas storage tank uses a Coanda nozzle, wherein the Coanda nozzle comprises a curved surface capable of directing feed gas that is injected into the gas storage tank along the inner surface of the gas storage tank; wherein the Coanda nozzle is operably connected to the gas storage tank at the feed (proximal) end to direct the feed gas along a curved surface of the Coanda nozzle, wherein a Coanda effect causes the feed gas to flow along the inner surface of the storage tank; providing a gas mixing zone at the proximal end of the gas storage tank in fluid communication with the feed gas; entraining the stored gas with the feed gas in the gas mixing zone to form a mixed gas using the feed gas that is flowing under the influence of the Coanda effect to direct the mixed gas to flow along the inner surface of the gas storage tank; and transferring heat from the flowing gas to the external walls of the tank.

The ratio of the sum of the induced gas and incoming gas mass flow rate divided by the mass flow rate of the incoming or motive gas is defined as the "Coanda ratio". The gas storage tank contains a phase change material anywhere in the inner surface, outer surface or the bulk of the tank. The gas storage tank further comprises an inner liner, wherein the inner liner is positioned inside the gas storage tank such that it forms a gap that gas can flow through, the gap being located between the inner surface of the tank and the inner liner. The inner liner comprises an orifice that defines a mixing zone at the Coanda nozzle, wherein the mixing zone can operably mix feed gas with storage (bulk) gas. The inner liner extends from the proximal end of the gas storage tank to at least 15% of the distance from the proximal end to the distal end. This allows the Coanda effect to produce an induced flow in the liner gap (microchannel) that is 2 to 20 times the feed gas flow rate (referred to as Coanda ratio) allowing the thorough mixing of the stored gas, which is at a higher temperature with the cold feed gas. The high recirculation rate of the stored gas increases the heat transfer coefficient and transfers the heat from the bulk of the gas to both the tank wall direction and the inner liner allowing us to absorb that heat into phase change material which is housed on one or both of these directions. Another alternative is to leave the PCM material on the exterior of the gas storage tank there by allowing the heat to be moved through the tank layers and finally stored in the phase change material. Another alternative is to house the phase change material in the bulk of the tank.

The state of charge (SOC) for the gas tank is defined as the ratio of hydrogen density at a given temperature and pressure to that at 15° C. and the nominal working pressure (NWP), NWP is 700 bar for the gas tanks used in hydrogen fuel cell vehicles.

In the claims, the term "flow" should be understood to mean a moving gas, such as gas transporting from one location to another.

In the claims, the term "gap" should be understood to mean a space for the gas to occupy, which is between two solid materials, such as the tank inner surface and the insert.

In the claims, the term "phase change material" (PCM) means a substance which releases/absorbs sufficient energy at phase transition to provide useful heat/cooling. Non-limiting examples include sodium acetate (such as ClimSem C58), paraffin waxes, solid-solid PCM solutions, clathrates, eutectics, salt hydrates, organic materials, and high temperature salts, and the like. Examples of PCMs and theft respective transition temperatures are: Paraffin 20-Carbons/36.7° C. (98.1° F.); Caprylone/40° C. (104° F.); Paraffin 21-Carbons/40.2° C. (104.4° F.); 4-Heptadacanone/41° C. (106° F.); Paraffin 22-Carbons/44° C. (111° F.); Lauric acid/44.2° C. (111.6° F.); 2-Heptadecanone/48° C. (118° F.); Barium hydroxide hydrate/48° C. (118° F.); Paraffin 25-Carbons/49.4° C. (120.9° F.); Camphene/50° C. (122° F.); Paraffin 24-Carbons/50.6° C. (123.1° F.); 9-Heptadecanone/51° C. (124° F.); Diphenyl amine/52.9° C. (127.2° F.); p-Dichlorobenzene/53.1° C. (127.6° F.); Chloroacetic acid/56° C. (133° F.); Tristearin/56° C. (133° F.); Paraffin 26-Carbons/56.3° C. (133.3° F.); Nitro naphthalene/56.7° C. (134.1° F.); Myristic acid/58° C. (136° F.); Paraffin 27-Carbons/58.8° C. (137.8° F.); Sodium acetate hydrate/58° C. (136° F.); Heptaudecanoic acid/60.6° C. (141.1° F.); Paraffin 28-Carbons/61.6° C. (142.9° F.); Bees wax/61.8° C. (143.2° F.); Paraffin 29-Carbons/63.4° C. (146.1° F.); p-Bromophenol/63.5° C. (146.3° F.); Paraffin 30-Carbons/65.4° C. (149.7° F.); Azobenzene/67.1° C. (152.8° F.); and Paraffin 31-Carbons/68° C. (154° F.)

Figure 2A:
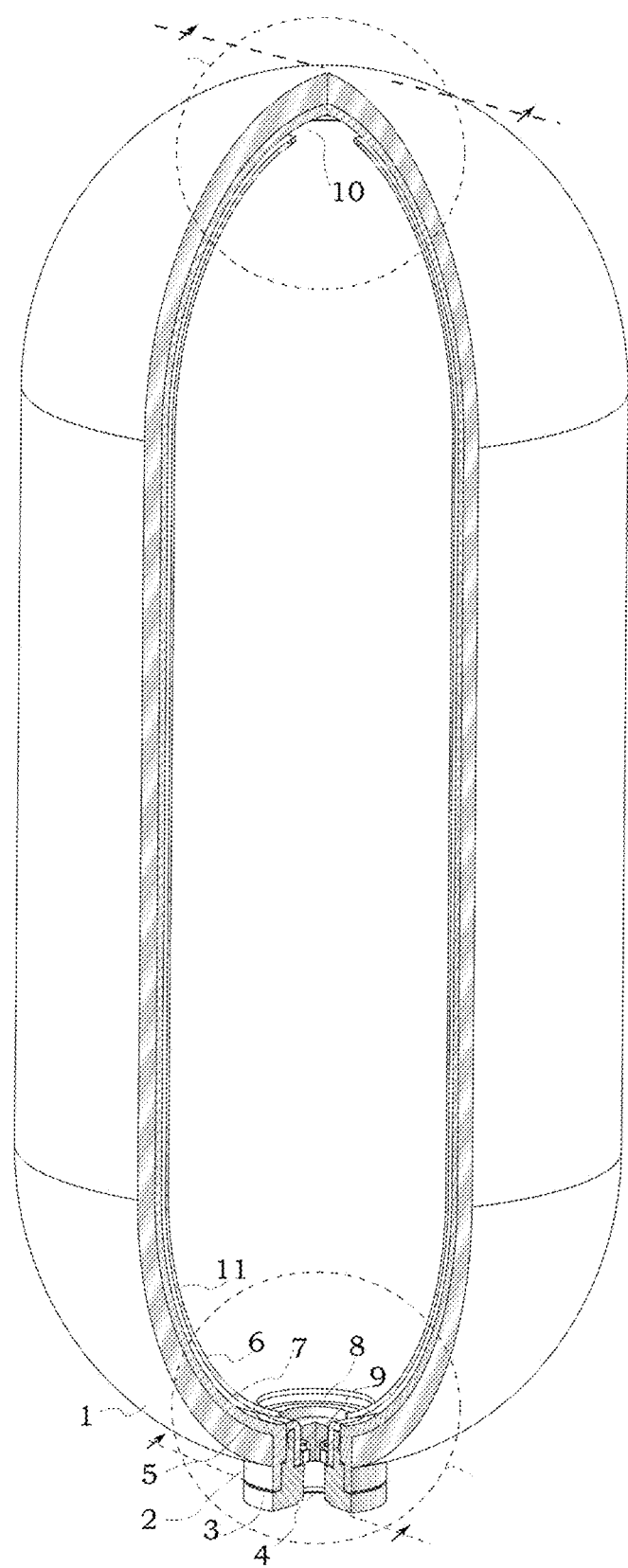
FIG. 2A: tank with quarter cut showing internal structure.
Figure 2B:
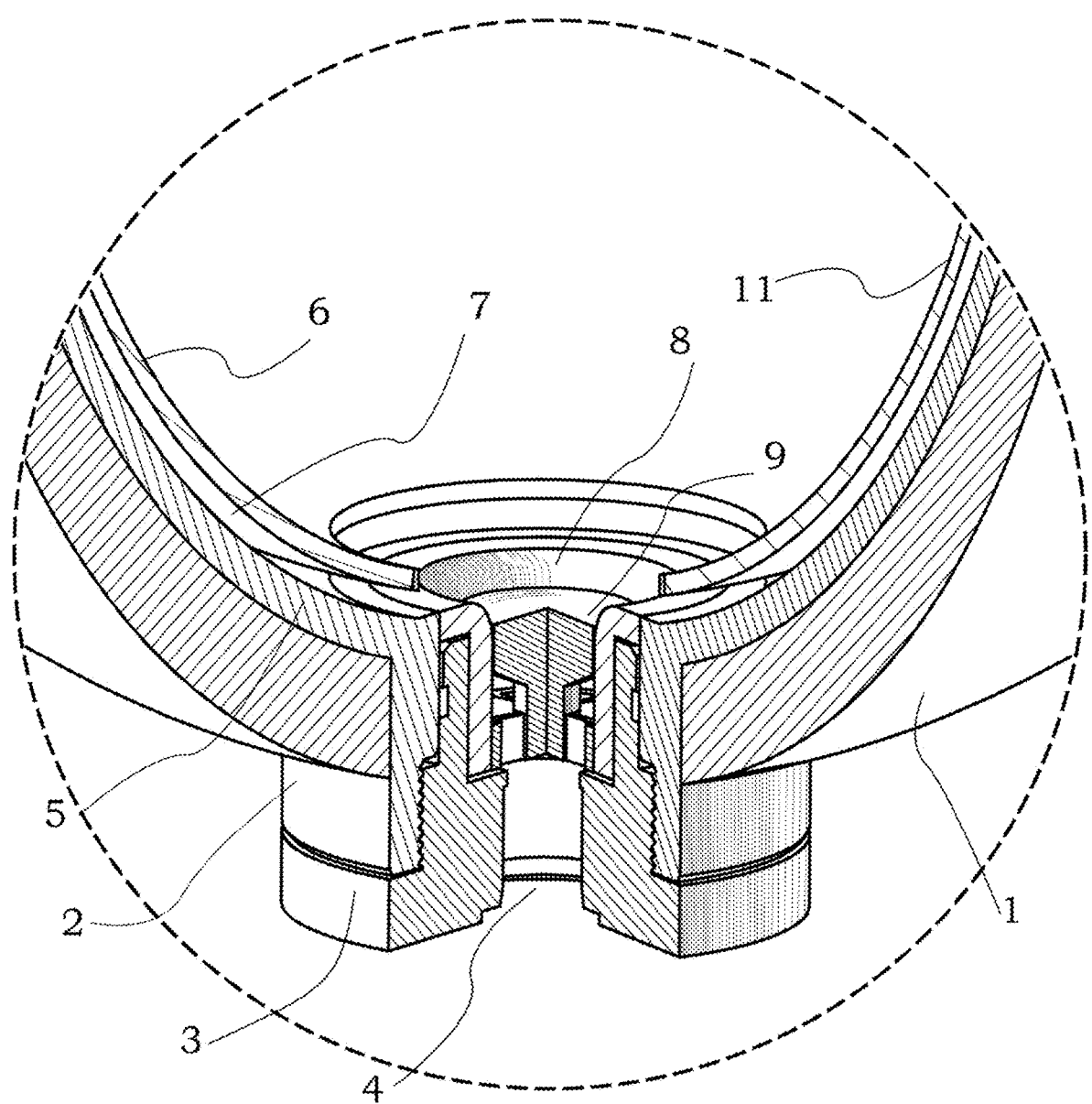
FIG. 2B: tank with quarter cut showing enlarged view of internal features at the proximal end (with the Coanda nozzle).
Figure 2C:
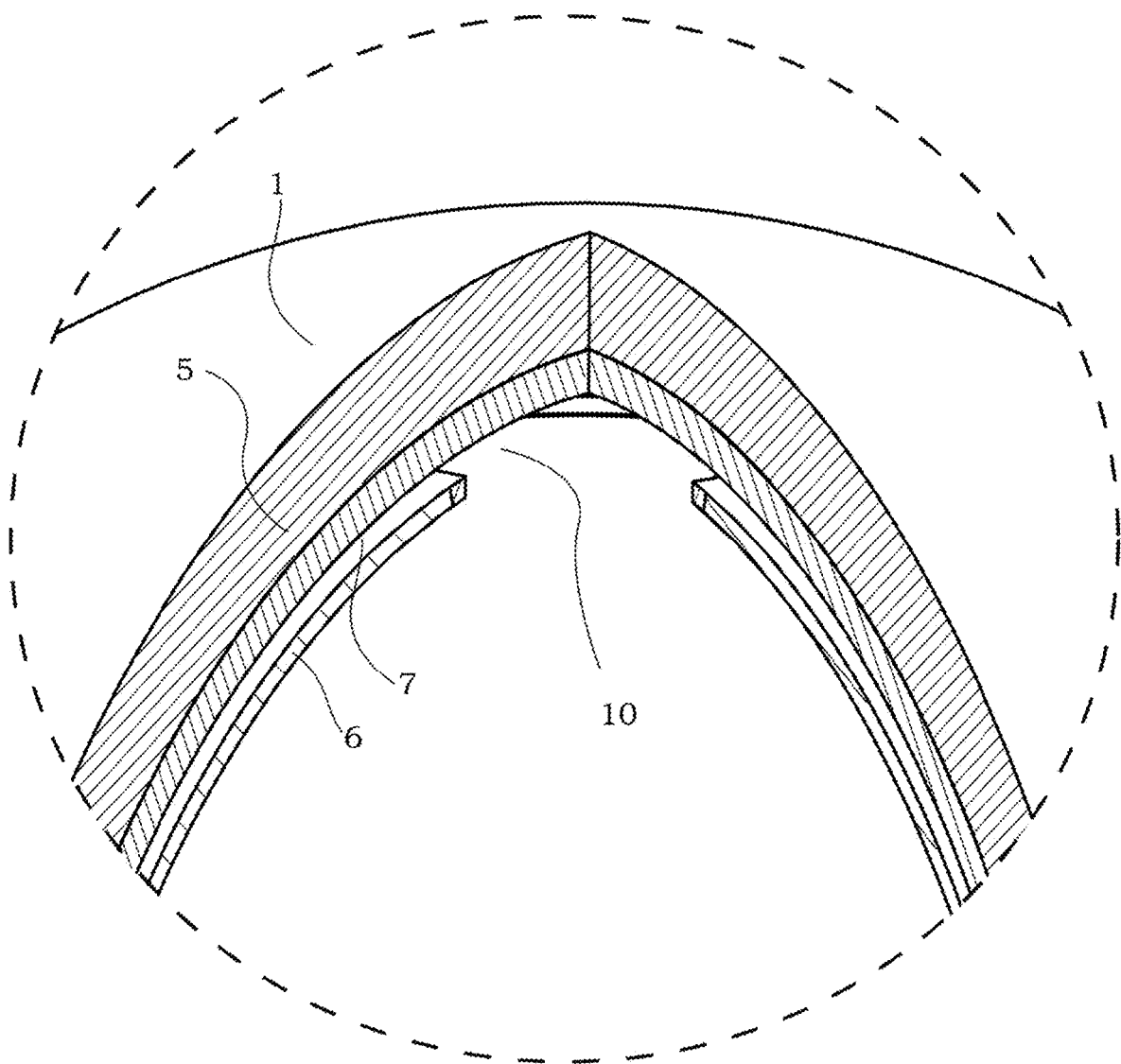
FIG. 2C: tank with quarter cut showing enlarged view of internal features at the distal end.

FIG. 1 shows a gas storage tank (pressure vessel) composite over wrap (and example being external carbon fiber reinforced composite) 1, the tank boss (opening) 2, which is shown as part of the liner, the Coanda nozzle housing 3 and dashed lines show the cut section used for FIGS. 2A, 2B and 2C.

FIGS. 2A, 2B and 2C show the external and internal structure of a gas storage tank. This includes the external carbon fiber reinforced composite 1 (or other structural pressure vessel material), the liner 2, the Coanda nozzle adapter 3, the feed gas inlet 4, the internal surface of the gas storage tank 5 (also made from the liner), an internal insert (optionally a PCM material) 6, which forms a gap 7, the curved surface of a Coanda nozzle 8, the Coanda nozzle spacer 9 that forces the flow of feed gas to accelerate around the curve 8, The exit of the gap 10, shown at the distal end of the tank, and the inside surface 11 of the internal insert 6, which is in contact with the stored gas (bulk gas) inside the tank.

Figure 3:
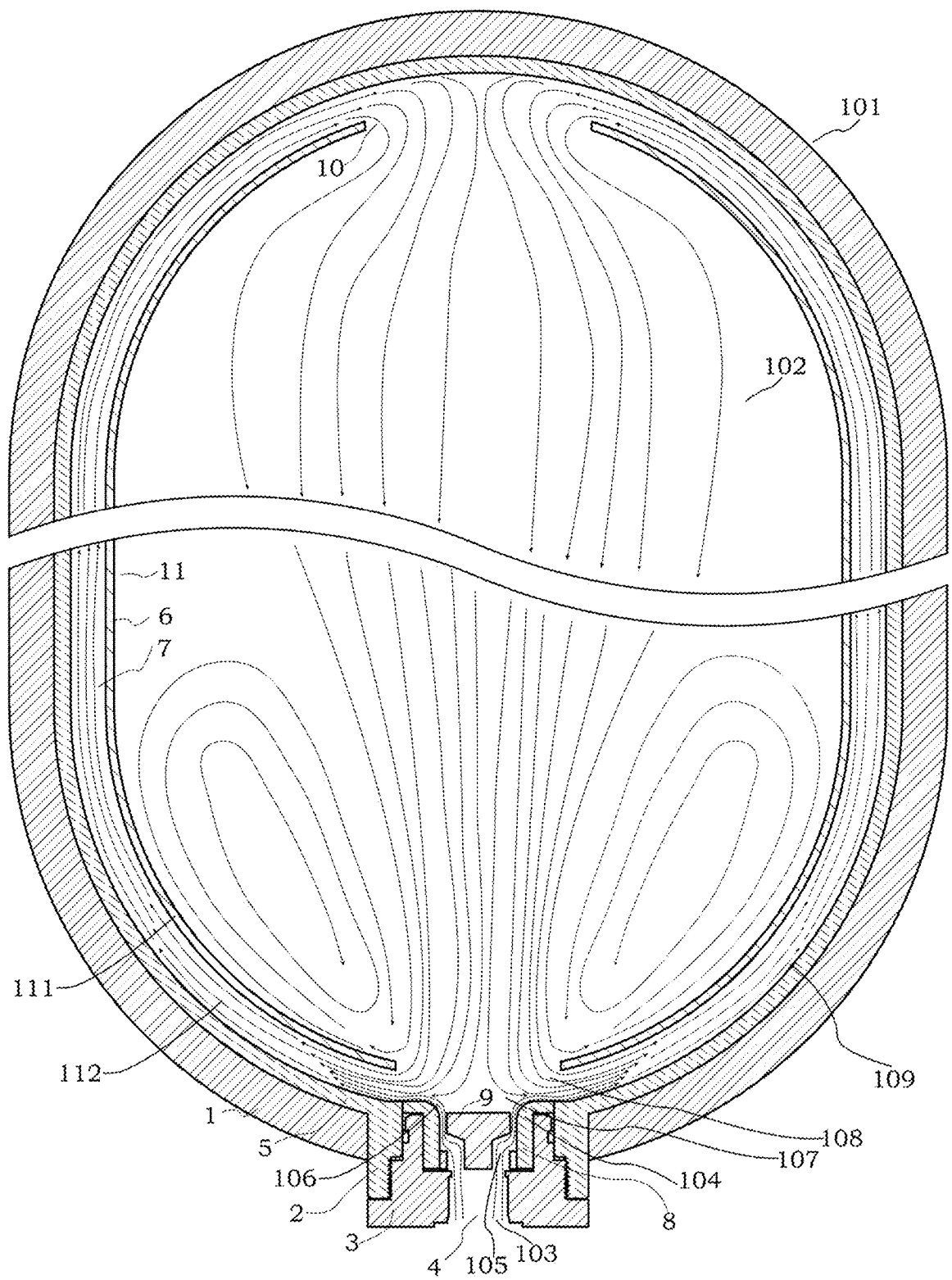
FIG. 3: slice view of a tank with an inner liner forming a gap, and the resulting gas flow pattern during filling, with features of the method labeled.
Figure 4:
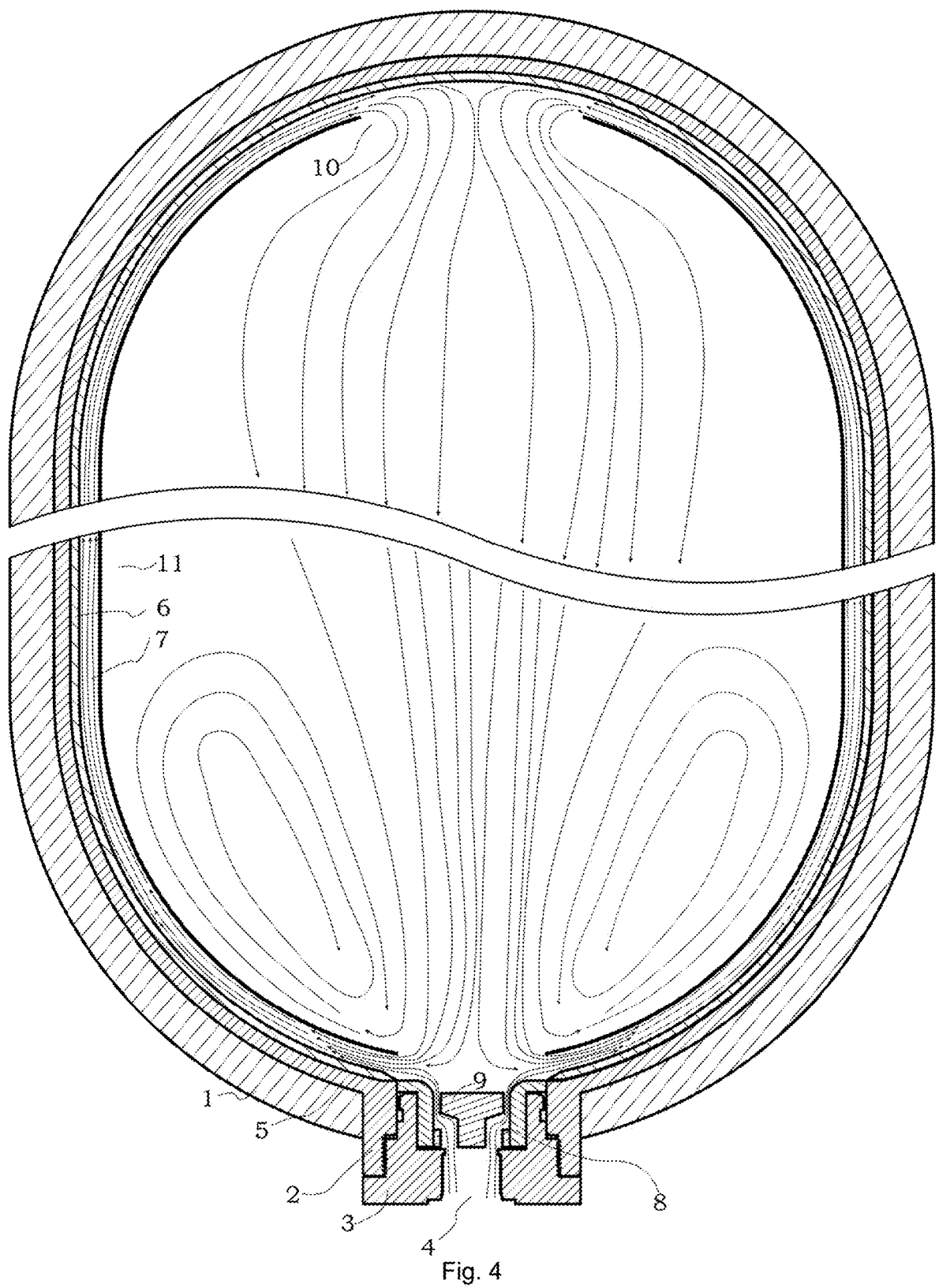
FIG. 4: slice view of a tank with an inner liner forming a gap, and the resulting gas flow pattern during filling, with features of the device labeled.
Figure 5:
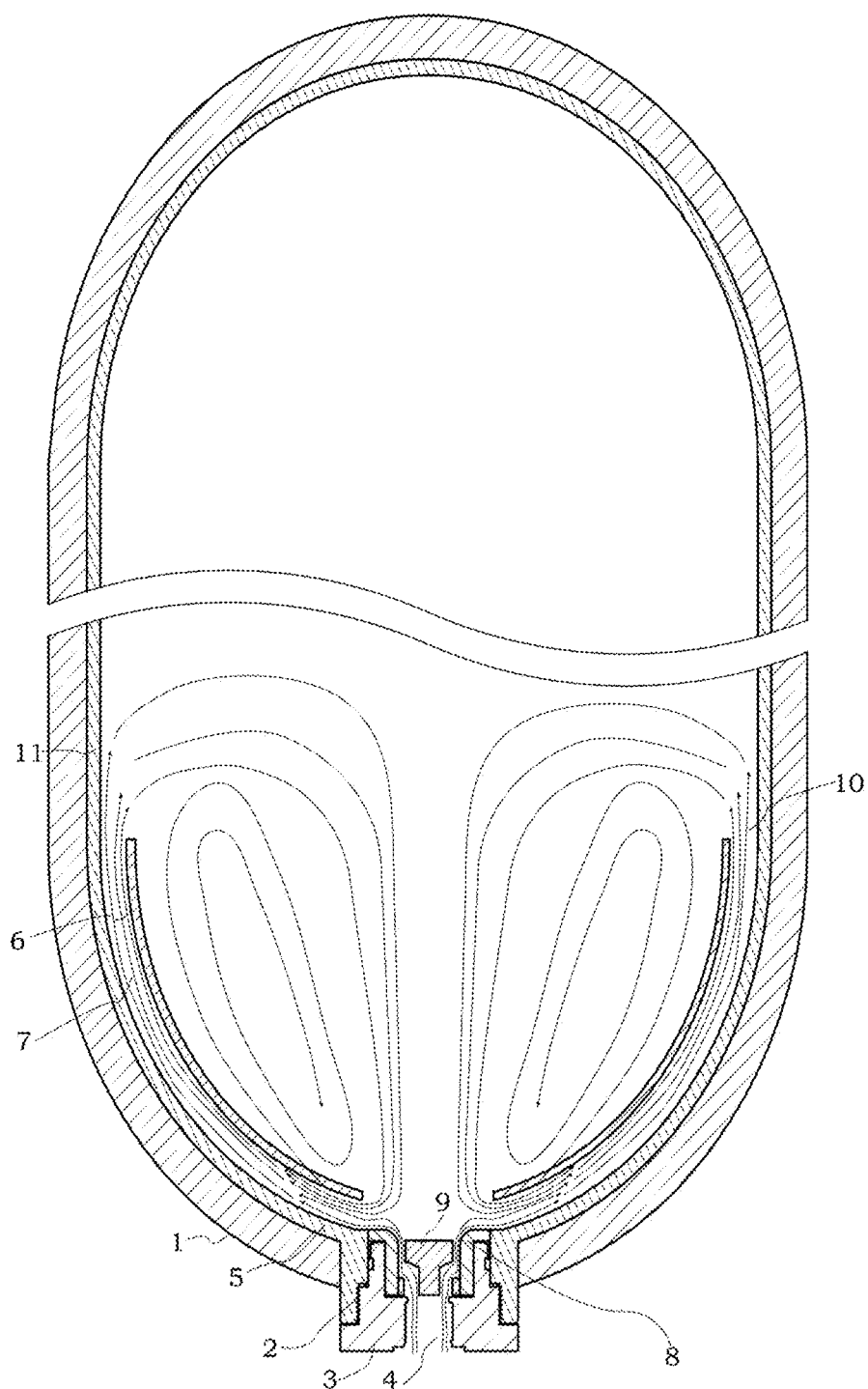
FIG. 5: slice view of a tank with gap that extends partially from the proximal end to the midpoint.
Figure 6:
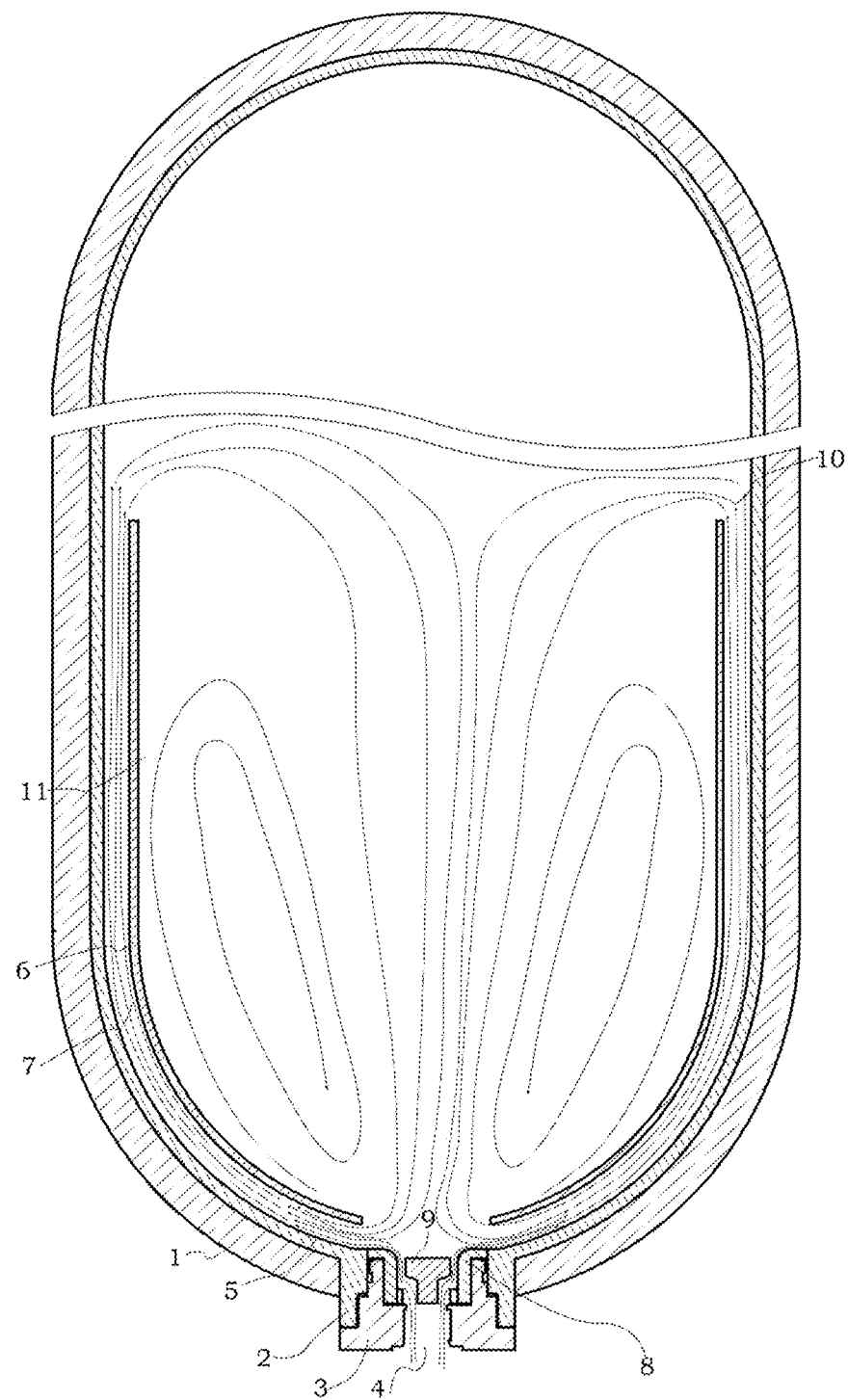
FIG. 6: slice view of a tank with a gap that extends from the proximal end to the midpoint.
Figure 7:
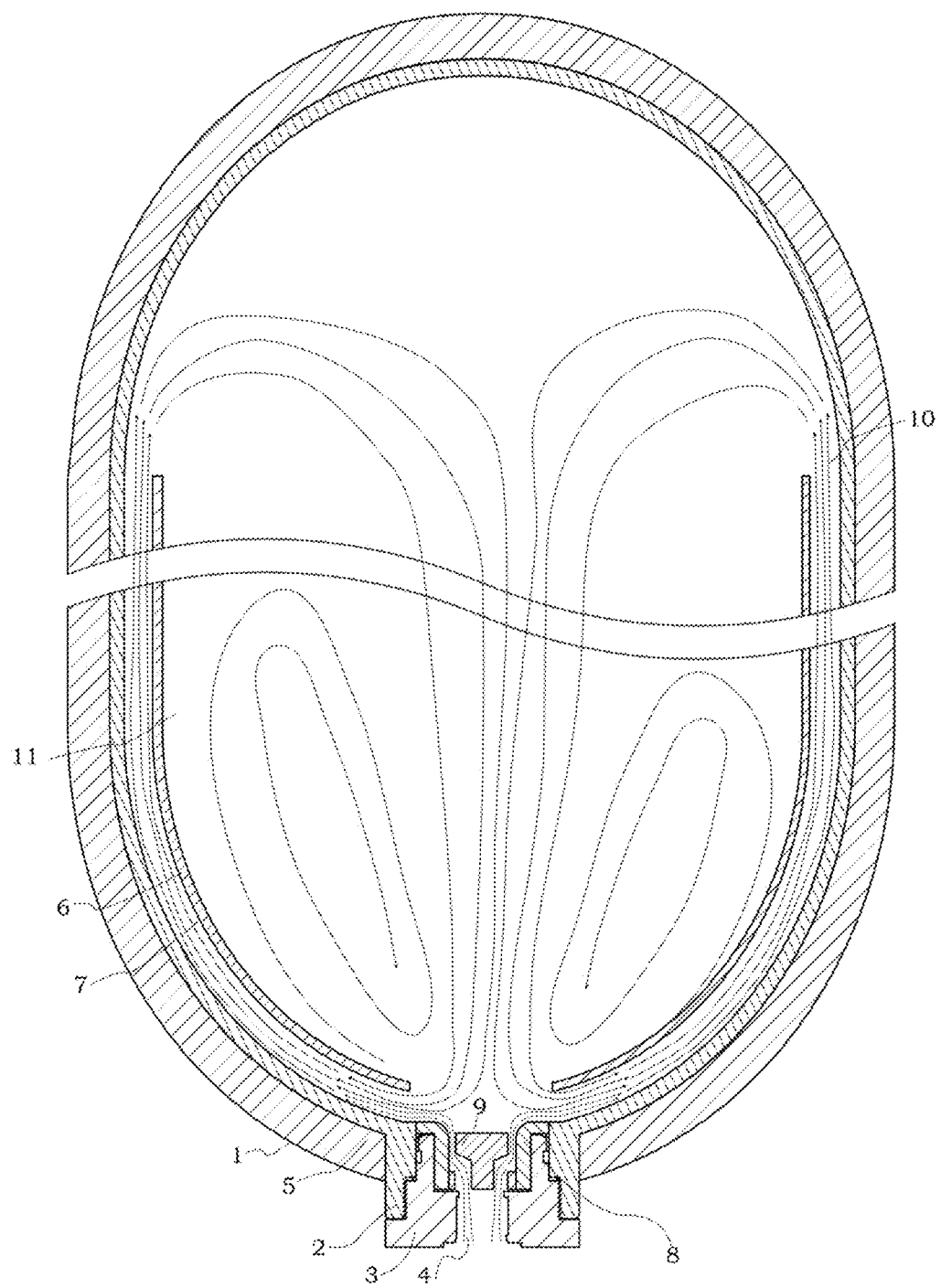
FIG. 7: slice view of a tank with a gap that extends from the proximal and to neat the distal end.
Figure 8A:
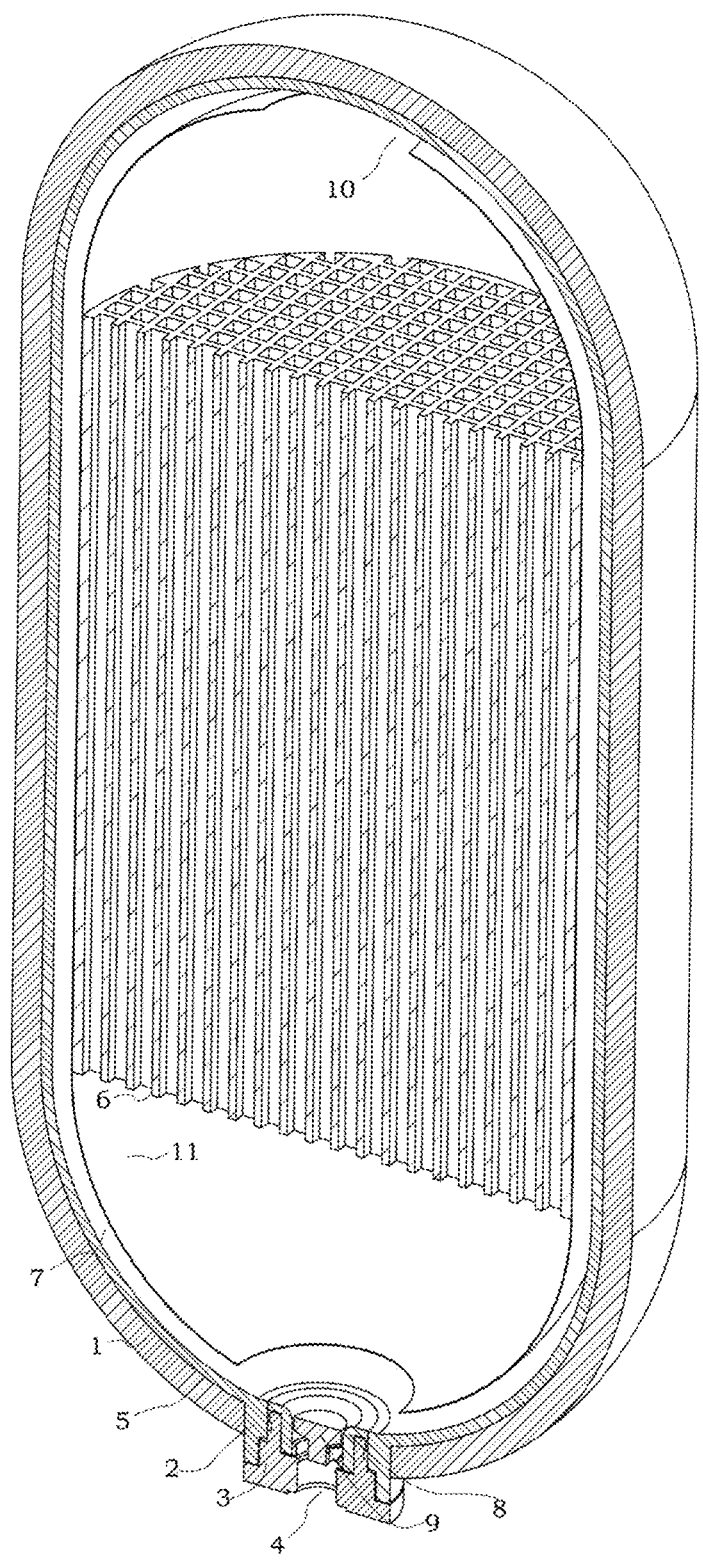
FIG. 8A: 3-D sliced view of a tank with a PCM monolith insert.
Figure 8B:
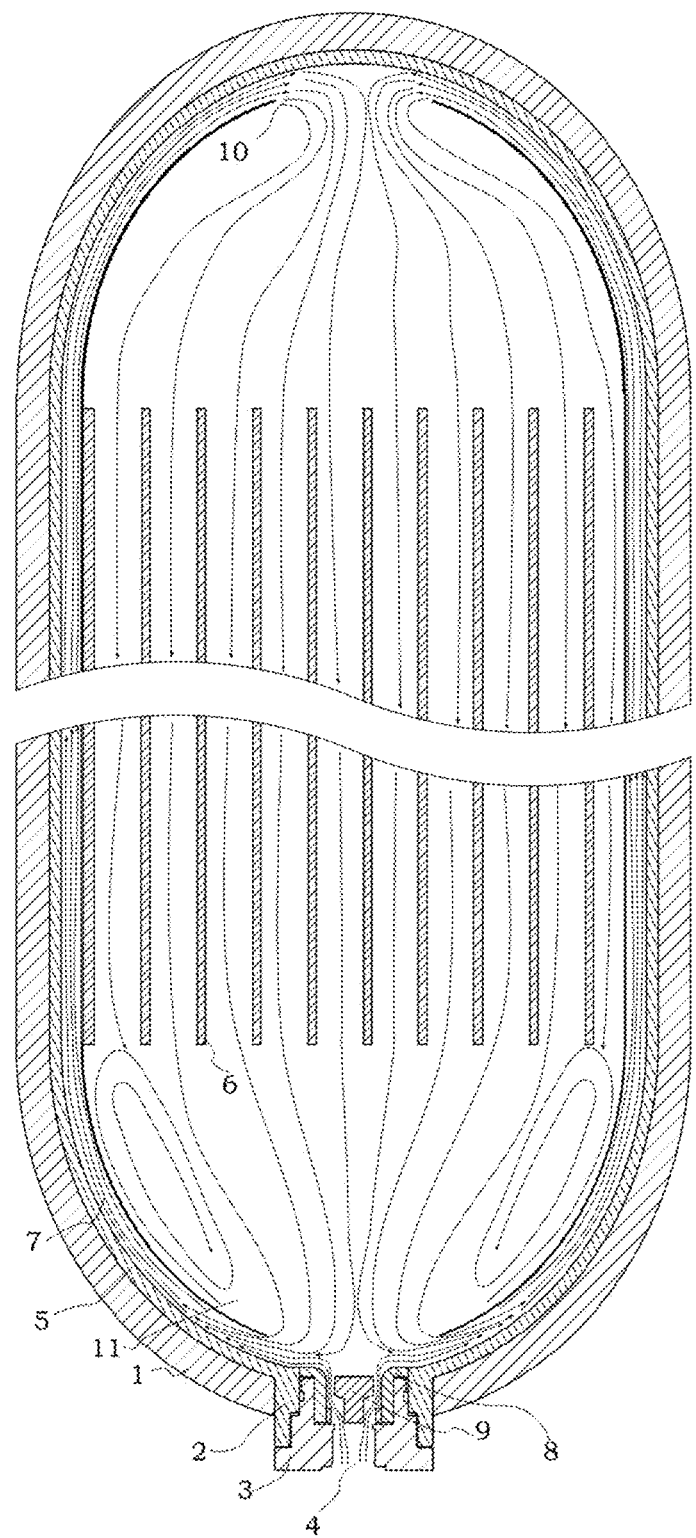
FIG. 8B: slice view of a tank with a PCM monolith insert.

FIG. 3 shows features of the tank and also identifies embodiments of the method of rapidly filling with moderated temperature rise. It shows the external and internal structure of a gas storage tank. This includes the external carbon fiber reinforced composite 1 (or other structural pressure vessel material), the liner 2 with the tank boss, the Coanda nozzle adapter 3, the feed gas inlet 4, the internal surface of the gas storage tank 5 (also made from the liner), an internal insert (optionally a PCM material) 6, which forms a gap 7, the curved surface of a Coanda nozzle 8, the Coanda nozzle spacer 9 that forces the flow of feed gas to accelerate around the curve 8, The exit of the gap 10, shown at the distal end of the tank, and the inside surface 11 of the internal insert 6, which is in contact with the stored gas (bulk gas) inside the tank. Additionally, FIG. 3 shows the external surface of the tank 101, the stored gas 102 inside the gas storage tank, and it's induced flow during filling, the feed gas 103 flowing into the Coanda nozzle, injecting the feed gas into the gas storage tank through the Coanda nozzle 105, using the Coanda nozzle to direct the feed gas along a curved surface of the Coanda nozzle 8, wherein a Coanda effect 106 causes the feed gas to flow along the inner surface of the storage tank; element label 104 points to Coanda nozzle 8 in FIG. 3 and indicates that Coanda nozzle 8 is effectively connected to tank 5 with an example of the physical alignment of nozzle 8 and tank 5 as shown in FIG. 3; providing a gas mixing zone 107 at the proximal end of the gas storage tank in fluid communication with the feed gas; entraining 108 the stored gas with the feed gas in the gas mixing zone to form a mixed gas using the feed gas that is flowing under the influence of the Coanda effect to direct the mixed gas to flow along the inner surface of the gas storage tank; and transferring heat 109 from the flowing gas to the external walls of the tank. Also shown are providing a phase change material 111 along the inner surface of the gas storage tank; and transferring heat 112 from the flowing gas to the phase change material (112 indicates a example location of the flowing gas where heat is transferred from).

Additional variations are shown in FIGS. 4, 5, 6, 7 and 8.

Figure 9:
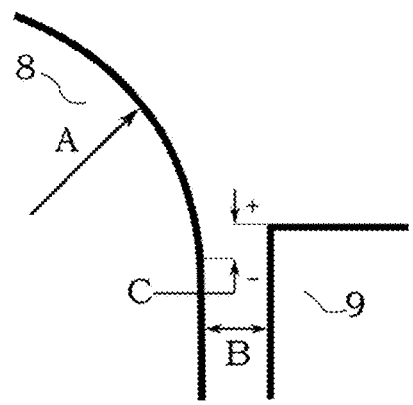
FIG. 9: critical dimensions of the Coanda nozzle.

EXAMPLE 1: Computational Fluid Dynamic (CFD) simulations of the Coanda effect was carried out with Solidworks Flowsim® module for a sub-scale tank fitted with a Coanda nozzle at a tank pressure of 200 bar during refilling process with an inlet flow of hydrogen of 0.0033 kg/sec. The gas velocity and the pressure contours in the proximal end of the storage tank where the Coanda nozzle directs the inlet gas flow were simulated. The Coanda effect causes the inlet gas flow to stay along the curved surface and creates a negative pressure in the inlet end of the gas tank which results in the the stored gas getting mixed with inlet flow and pulled along the curved surface of the Coanda nozzle/tank. This mixed flow then gets directed through the gap between the tank wall and the inner liner. In these simulations several key parameters in the Coanda nozzle design were changed and found to influence the Coanda ratio: 1) the Coanda curve radius (dimension A in FIG. 9); 2) gap width where the hydrogen flows between the spacer and Coanda curve (referred to as Coanda nozzle diameter, dimension B in FIG. 9); 3) location of the inner space edge in relation to the Coanda curve (dimension C in FIG. 9); and, 4) the inlet gap length height of the spacer, 9 in FIG. 9. The resulting Coanda ratios are also shown in FIG. 9.

Figure 10:
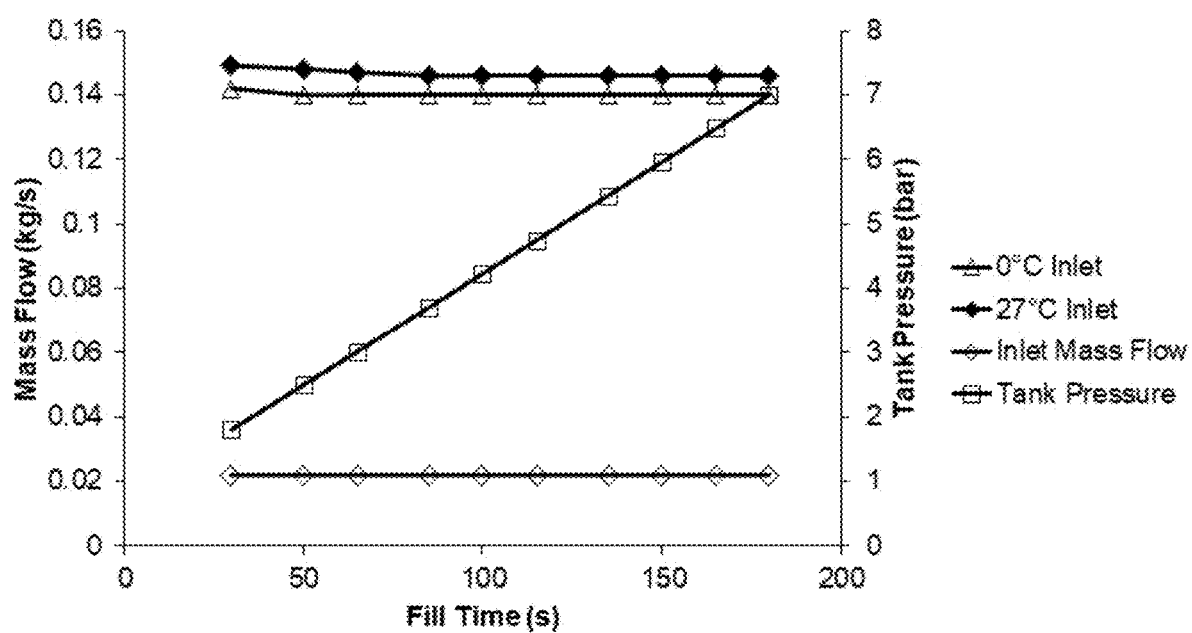
FIG. 10: results for Example 2.

EXAMPLE 2: CFD simulations of the Coanda nozzle in Fluent ANSYS® with a throat width (gap width) of 0.0762 mm (0.003 inches) and a hydrogen flow rate of 0.022 kg/s into a 120 L tank. The steady state simulations were repeated for several time "snapshots" with tank pressure and temperature initialized to those that would be seen during the actual fill. Two inlet gas temperatures of 0 and 27° C. were also considered. The results (shown in FIG. 10) indicate that the induced flow due to Coanda effect stays constant regardless of the fill pressure.

EXAMPLE 3: CFD simulations of the tank refill process were carried out with the inlet gas at 0° C. for three different scenarios: 1) adiabatic fill—a regular gas storage tank with no Coanda nozzle present to direct the flow or a phase change material (PCM) to absorb the heat of compression; 2) coanda flow with PCM layer next to wall—tank equipped with a Coanda nozzle to direct the inlet flow and a PCM layer next to tank wall (liner) to absorb the heat of compression; wherein coanda flow (sum of the inlet gas flow and the induced gas flow) is in the gap between the PCM and the bulk gas; and, 3) Coanda flow with PCM layer next to bulk gas—tank equipped with a Coanda nozzle to direct the inlet flow and a PCM layer between bulk gas and the Coanda flow; wherein Coanda flow is in the gap between the tank wall (liner) and the PCM PCM selected for these simulations was ClimSel C58, which has a melting point of 58° C. ClimSel C58 is a PCM manufactured by Climator Sweeden AB and is mainly composed of sodium acetate, water and additives. The CFD simulations showed that for both the Coanda flow cases the gas temperature was maintained well below the liner temperature limit of 85° C. while for the adiabatic fill case the gas temperature increases to 97° C. When having the Coanda flow between the tank liner (wall) and the PCM layer; where in PCM layer is both next to bulk gas and the coanda flow, provided better heat transfer and kept the gas temperature to less than 61° C. while the case (scenario) where the coanda flow is between the bulk gas and the PCM layer; wherein the PCM layer is next to tank liner (wall), provided lower heat transfer and the gas temperature reached 72° C. In both the coanda flow cases the tank liner (wall) temperature was maintained at 58° C. compared to 93° C. for the adiabatic fill. These simulations were carried out to 100% SOC so all the cases resulted in the same SOC, however the final pressures were different for each of the cases (scenarios). In addition to being able to use higher inlet gas temperatures of 0 to 25° C. The final fill pressure was lower for the coanda flow cases demonstrating the energy savings due to lower compression energy needs.

Figure 11:
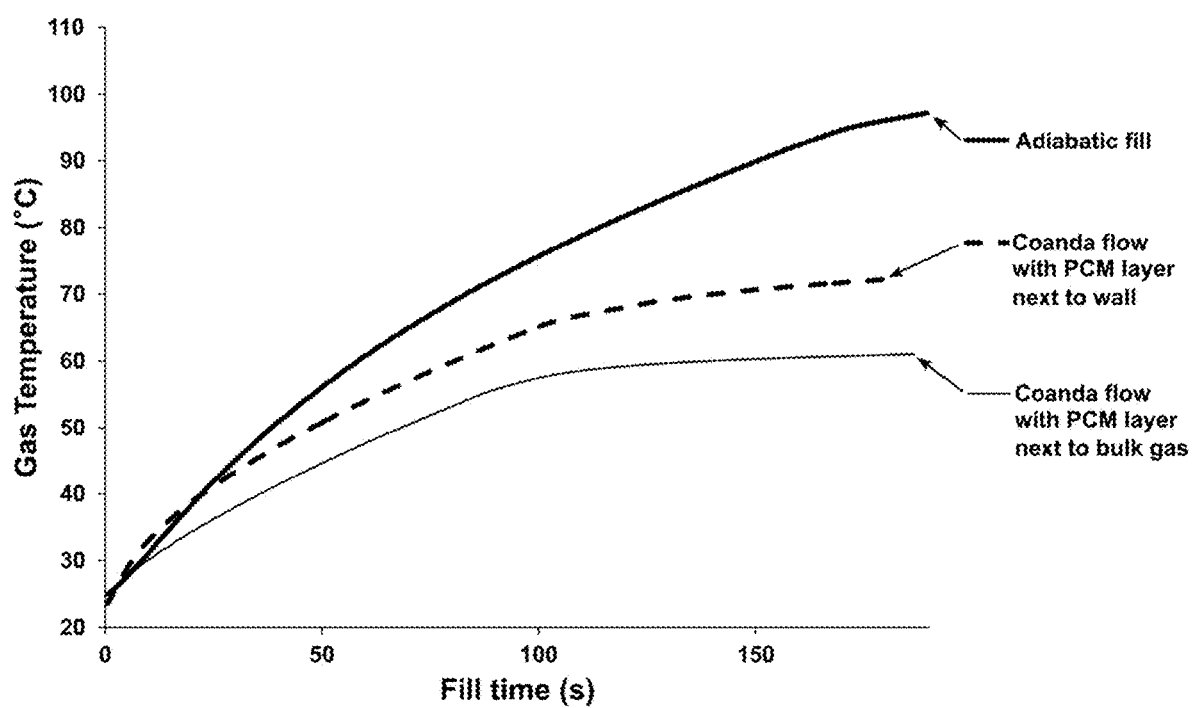
FIG. 11: the average gas temperature in the gas tank during the refilling process for the three cases (scenarios) in Example 3.

FIG. 11 shows the average gas temperature in the gas tank during the refilling process for the three cases (scenarios) in Example 3. It is seen that for the adiabatic case the gas temperature keeps increasing all through the refill process and the final gas temperature (97° C.) exceeds the maximum allowable liner (wall) temperature of 85° C. In the Coanda flow cases as the gas temperature exceeds the melting point of the phase change material (58° C.) the heat of compressions gets transferred to the phase change material and the rate of increase of the gas temperature slows down significantly compared to the adiabatic fill case and the final gas temperature was 72° C. for the case where Coanda flow is between bulk gas and phase change material compared to 61° C. for the case where the Coanda flow is between the tank wall (liner) and the phase change material, which resulted in having the phase change material between the Coanda flow and the bulk gas flow allowing for heat transfer from both directions into the phase change material.

Figure 12:
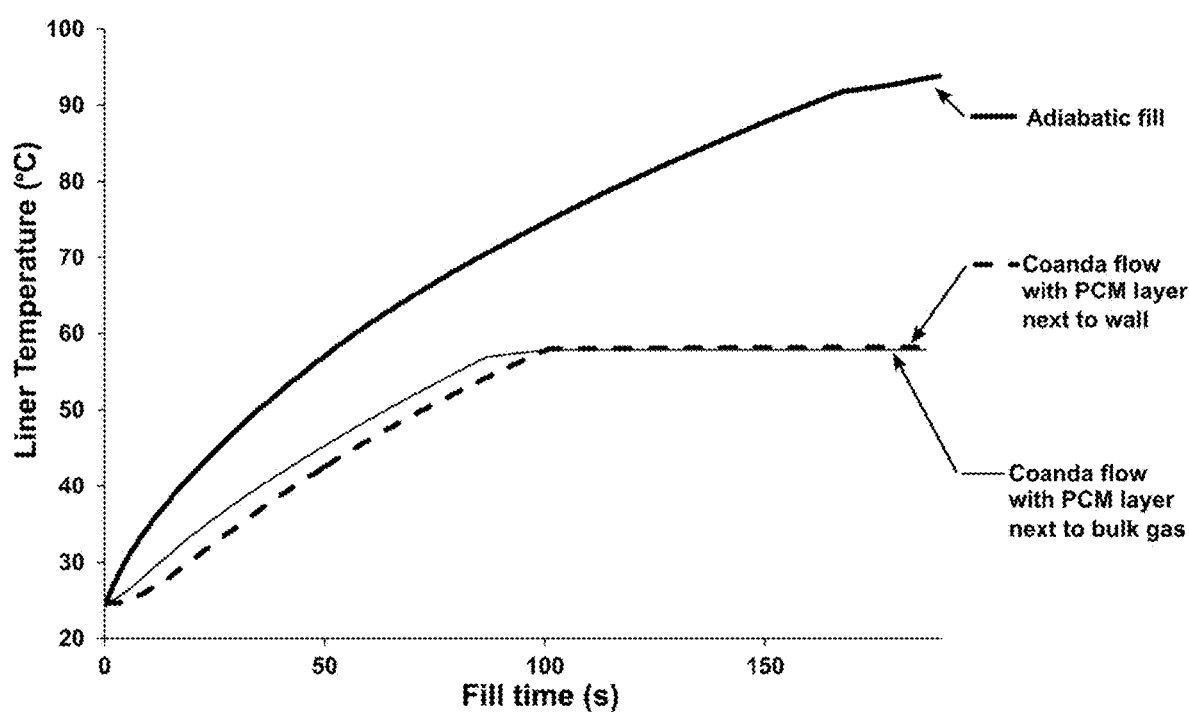
FIG. 12: the average liner temperature (wall) in the gas tank during refill process for the three cases (scenarios) in Example 3.

FIG. 12 shows the average liner temperature (wall) in the gas tank during refill process for the three cases (scenarios) in Example 3. It is seen that for the adiabatic case the liner temperature follows the gas temperature and keeps increasing all through the refill process and the final liner temperature (94° C.) exceeds the maximum allowable liner (wall) temperature of 85° C. In both the coanda flow cases as the gas temperature exceeds the melting point of the phase change material (58° C.) the heat of compressions gets transferred to the phase change material and liner temperature is maintained at the melting point (58° C.) of the phase change material used.

The final gas and liner temperatures and the fill pressures for the three cases) 9 scenarios) are summarized in the table below. The final gas temperature for the two coanda flow cases with phase change material are between 25 to 40% lower while liner temperature is 40% lower when using an inlet hydrogen gas available at 0° C. for the refill.

| Case | Gas Temperature at 100% SOC (° C.) | Liner/PCM Temperature at 100% SOC (° C.) | Gas Pressure at 100% SOC (bar) |
| --- | --- | --- | --- |
| 1 | 97 | 94 | 875 |
| 2 | 72 | 58 | 834 |
| 3 | 61 | 58 | 807 |

Figure 13:
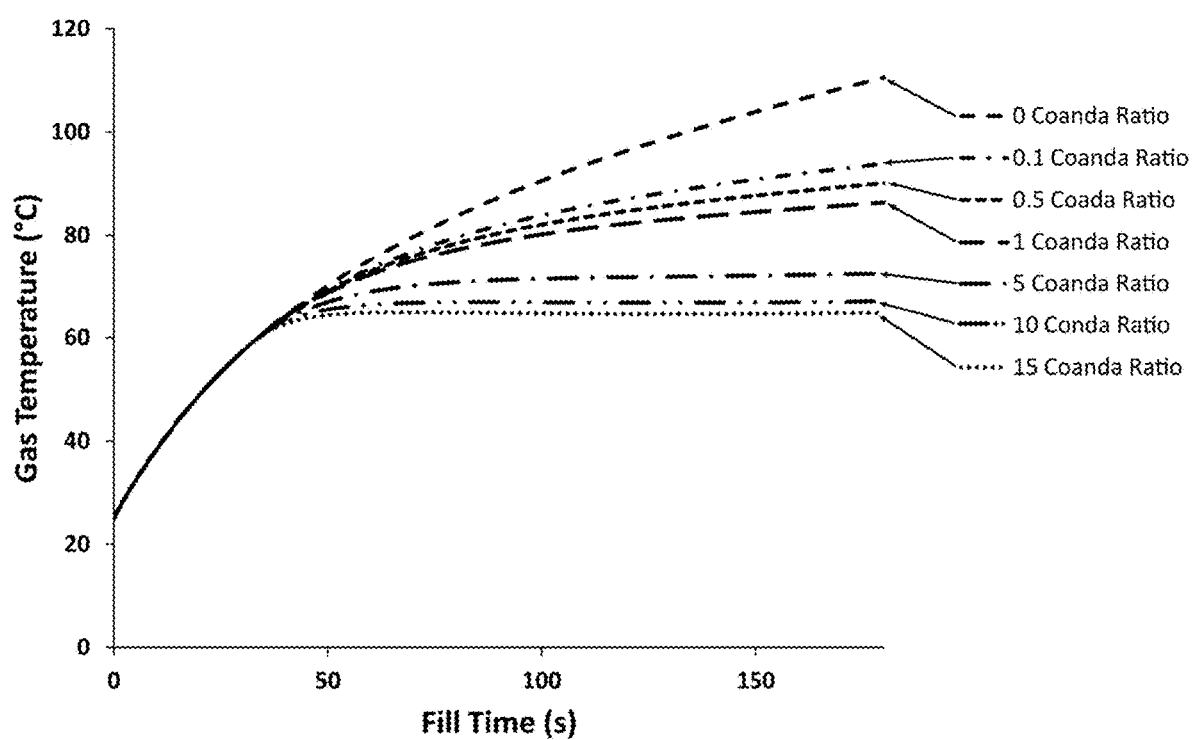
FIG. 13: the impact of Coanda ratio on the gas temperature is shown when using an inlet gas temperature of 25° C. in Example 4.

EXAMPLE 4: In this example the impact of Coanda ratio on the gas temperature is shown when using an inlet gas temperature of 25° C. Simulations were carried out with different Coanda flow ratios from 0 to 15. The results in FIG. 13 show that when even a small amount of the feed gas flow (10%) is routed along the tank wall it can reduce the gas temperature significantly. When the Coanda ratio (defined as the ratio of the sum of the inlet gas flow and the induced gas flow defined as Coanda flow to the inlet gas flow) is 1 the final gas temperature gets below the 85° C. limit. When the Coanda ratio get to 5 or above the gas temperature is maintained close to the melting point of the phase change material and we see a change in the shape of the gas temperature curve is kept closer to the melting point of the phase change material. This indicates that when Coanda ratio exceeds 5 most of the heat of compression is transferred to the phase change material during refill process. Even a small Coanda ratio of 0.1 from 1.0 to 1.1 (i.e., only 10% induced flow) can reduce the gas temperature significantly by 20° C. or more.

Although the present invention has been described in considerable detail with reference to certain preferred versions thereof, other versions are possible. For example other gasses could be used instead of hydrogen, such as natural gas, etc. Therefore, the spirit and scope of the appended claims should not be limited to the description of the preferred versions contained herein, except where required by 35 U.S.C. § 112 ¶6 or 35 U.S.C. § 112 (f).

All the features in this specification (including any accompanying claims, abstract, and drawings) may be replaced by alternative features serving the same, equivalent or similar purpose, unless expressly stated otherwise. Thus, unless expressly stated otherwise, each feature disclosed in one example only of a generic series of equivalent of similar features. Any element in a claim that does not explicitly state "means for" performing a specified function, or "step for" performing a specific function, is not to be interpreted as a "means" or "step" clause as specified in 35 U.S.C. § 112 ¶6 or 35 U.S.C. § 112 (f). Any element in a claim that does explicitly state "means for" performing a specified function, or "step for" performing a specific function, is to be interpreted as a "means" or "step" clause as specified in 35 U.S.C. § 112 ¶6 or 35 U.S.C. § 112 (f).

What is claimed is:
1. A method for rapidly filling a compressed gas storage tank with a moderated temperature rise, comprising:
  a. providing a gas storage tank, wherein the gas storage tank has an inner surface, an outer surface, a proximal end, a distal end, and a midpoint between the proximal end and the distal end;

b. providing a stored gas, wherein the stored gas is contained inside the gas storage tank;
c. providing a feed gas;
d. providing a Coanda nozzle to inject the feed gas into the gas storage tank, wherein the Coanda nozzle is effectively connected to the proximal end of the gas storage tank;
e. injecting the feed gas into the gas storage tank through the Coanda nozzle;
f. using the Coanda nozzle to direct the feed gas along a curved surface of the Coanda nozzle, wherein a Coanda effect causes the feed gas to flow along the inner surface of the gas storage tank;
g. providing a gas mixing zone at the proximal end of the gas storage tank that is in fluid communication with the feed gas;
h. entraining the stored gas with the feed gas in the gas mixing zone to form a mixed gas using inertia of the feed gas that is flowing under influence of the Coanda effect to direct the mixed gas to flow along the inner surface of the gas storage tank;
i. transferring heat from the mixed gas to the gas storage tank;
j. providing a phase change material along the inner surface of the gas storage tank;
k. transferring heat from the flowing gas to the phase change material;
l. providing an inner liner and providing a gap, wherein the inner liner is positioned inside the gas storage tank such that it forms the gap between the inner surface of the gas storage tank and the inner liner, wherein the mixed gas flows through the gap; and,
wherein providing the inner liner provides the gap for the mixed gas to flow through that is continuous from the proximal end to at least 15% of a length from the proximal end to the distal end of the gas storage tank.

2. The method of claim 1, wherein providing the inner liner provides the gap for the mixed gas to flow through that is continuous from the proximal end to at least to the midpoint of the gas storage tank.

3. The method of claim 2, wherein providing the inner liner provides the gap for the mixed gas to flow through that is continuous from the proximal end to at least 90% of a distance from the proximal end to the distal end of the gas storage tank.

4. The method of claim 3, wherein the inner liner comprises a phase change material and
m. transferring heat from the mixed gas to the inner liner.

5. A compressed gas storage tank for rapid filling with a moderated temperature rise, the gas storage tank comprising:
a gas storage tank comprising a pressure vessel, an inner surface, an outer surface, a proximal end, a distal end and a midpoint between the proximal end and the distal end;
a Coanda nozzle, wherein the Coanda nozzle is operably connected to the gas storage tank at the proximal end, and wherein the Coanda nozzle comprises a curved surface capable of directing feed gas that is injected into the gas storage tank along the inner surface of the gas storage tank;
an inner liner, wherein the inner liner is positioned inside the gas storage tank such that it forms a gap that injected gas can flow through, the gap being located between the inner surface of the gas storage tank and the inner liner;
wherein the inner liner comprises an orifice that defines a mixing zone adjacent to the Coanda nozzle, wherein the mixing zone can operably mix feed gas with gas inside the gas storage tank;
wherein the inner liner extends from the proximal end of the gas storage tank to at least 15% of a distance from the proximal end to the distal end.

6. The gas storage tank of claim 5, wherein the inner liner extends from the proximal end of the gas storage tank to at least the midpoint of the gas storage tank.

7. The gas storage tank of claim 6, wherein the inner liner extends from the proximal end of the gas storage tank to at least 90% of a distance from the proximal end to the distal end.

8. The gas storage tank of claim 7, wherein the inner liner comprises a phase change material.

* * * * *